(12) United States Patent
Coste et al.

(10) Patent No.: US 9,010,484 B2
(45) Date of Patent: Apr. 21, 2015

(54) SOURCE ACQUISITION WITH MULTIPLE FREQUENCY COMPONENTS

(71) Applicant: WesternGeco L.L.C., Houston, TX (US)

(72) Inventors: Emmanuel Coste, Oslo (NO); Claudio Bagaini, Bekkestua (NO); Robert Montgomery Laws, Cambridge (GB); Jon-Fredrik Hopperstad, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/916,313

(22) Filed: Jun. 12, 2013

(65) Prior Publication Data

US 2013/0333974 A1    Dec. 19, 2013

Related U.S. Application Data

(60) Provisional application No. 61/660,612, filed on Jun. 15, 2012.

(51) Int. Cl.
*G01V 1/38* (2006.01)
*G01V 1/04* (2006.01)
*G01V 1/137* (2006.01)
*G01V 1/00* (2006.01)

(52) U.S. Cl.
CPC .......... *G01V 1/137* (2013.01); *G01V 2210/127* (2013.01)

(58) Field of Classification Search
CPC ............ G01V 1/137; G01V 2210/127; G01V 1/3843; G01V 1/3861; G01V 1/387

USPC ................. 181/119, 107, 110, 111, 118, 120; 367/144, 177, 129, 130, 20, 23
See application file for complete search history.

(56) References Cited

U.S. PATENT DOCUMENTS

| 3,437,170 | A | * | 4/1969 | Brock et al. ................... 181/120 |
| 3,602,878 | A | * | 8/1971 | Sullivan .......................... 367/23 |
| 3,893,539 | A | * | 7/1975 | Mott-Smith ................... 181/115 |
| 4,382,486 | A | * | 5/1983 | Ruehle ........................... 181/118 |
| 4,486,864 | A | * | 12/1984 | Ongkiehong et al. .......... 367/23 |
| 4,727,956 | A | | 3/1988 | Huizer |
| 7,321,527 | B2 | | 1/2008 | Hopperstad et al. |
| 8,205,711 | B2 | * | 6/2012 | Hopperstad et al. .......... 181/111 |
| 2004/0008580 | A1 | | 1/2004 | Fisher et al. |
| 2004/0109389 | A1 | * | 6/2004 | Quinn et al. ................... 367/144 |
| 2010/0008185 | A1 | | 1/2010 | Moldoveanu |
| 2010/0149911 | A1 | | 6/2010 | Hopperstad et al. |
| 2011/0032795 | A1 | | 2/2011 | Kragh et al. |

(Continued)

FOREIGN PATENT DOCUMENTS

WO    2012123883    9/2012

OTHER PUBLICATIONS

International Search Report and Written Opinion of PCT Application No. PCT/US2013/045842 dated Sep. 26, 2013: pp. 1-11.

(Continued)

*Primary Examiner* — Edgardo San Martin

(57) ABSTRACT

A seismic source array includes a first source and a second source. The first source has a first spectral output and the second source has a second spectral output different than the first spectral output. The first source has a first total volume different than a second total volume of the second source.

17 Claims, 6 Drawing Sheets

(56) References Cited

U.S. PATENT DOCUMENTS

2012/0048642 A1   3/2012  Hopperstad et al.
2012/0147701 A1*  6/2012  Ross et al. ........................ 367/23
2012/0218869 A1*  8/2012  Hopperstad et al. .......... 367/144
2012/0314536 A1  12/2012  Bagaini
2013/0336087 A1  12/2013  Laws

OTHER PUBLICATIONS

J.F. Hopperstad, et al., "Hypercluster of Airguns —More Low Frequencies for the Same Quantity of Air", 74th EAGE Conference & Exhibition, Copenhagen, 2012.

* cited by examiner

SOURCE ACQUISITION WITH MULTIPLE FREQUENCY COMPONENTS

CROSS-REFERENCE TO RELATED APPLICATION

This application claims the benefit of U.S. Provisional Patent Application Ser. No. 61/660612 filed Jun. 15, 2012, which is incorporated herein by reference in its entirety.

BACKGROUND

In seismic applications, air gun source arrays are often used to generate acoustic output, which when reflected off subsurface formations may be detected by associated seismic receivers. This data may be used to obtain an image of subsurface formations to assess the likelihood of hydrocarbon production.

The air gun used in seismic acquisition can be an impulsive source, outputting energy across a broad range of frequencies. Air guns may be grouped into an array made of sub-arrays fired in sync, to generate broadband energy. The source array can then be fired at periodic intervals that are limited by filling time restrictions (e.g., limitations on compressor capacity and gun cable length/diameter).

There is a need for improved processes and structures to improve and/or enable better control of the acoustic spectra of the air gun array.

BRIEF SUMMARY

The present disclosure generally relates to a system and method for generating desired frequency output during seismic surveying. In some embodiments, a source array according to the present disclosure includes a first source and a second source. The first source has a first spectral output and a first total volume, while the second source has a second spectral output and a second total volume. In such embodiments, the second spectral output is different than the first spectral output and the second total volume is different than the first total volume. The first and second sources may be towed at substantially the same depth or at different depths. Related methods of generating desired frequency output for seismic operations are described. In this manner, seismic operations may be carried out in which certain source components are utilized to generate relatively low frequency output, while other source components are utilized to generate relatively high frequency output.

BRIEF DESCRIPTION OF THE DRAWINGS

Reference is now made to the following descriptions taken in conjunction with the accompanying drawings.

DETAILED DESCRIPTION

Various embodiments of a system and method are described. It is to be understood, however, that the following explanation is merely exemplary in describing the devices and methods of the present disclosure. Accordingly, several modifications, changes and substitutions are contemplated.

Figure 1:
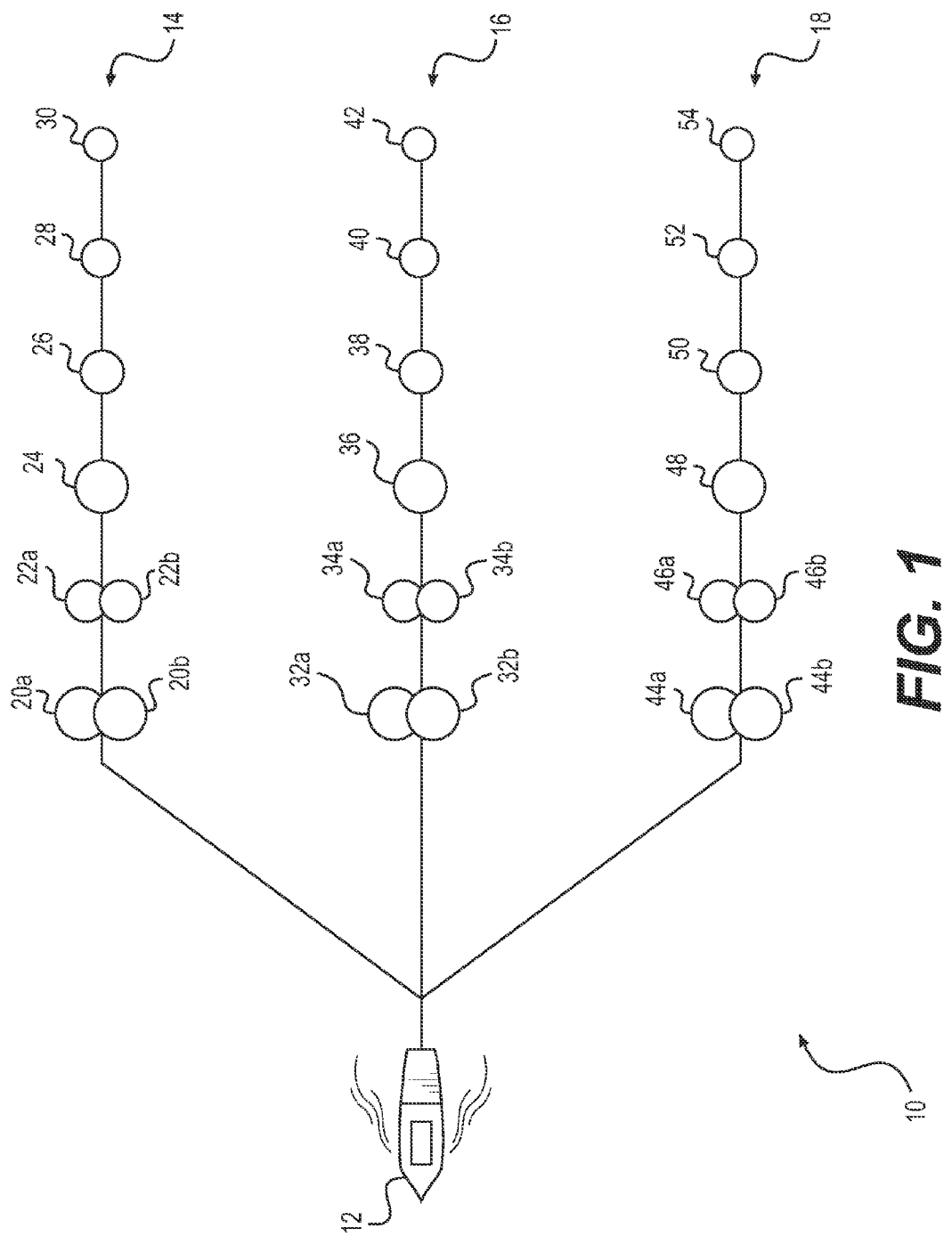
FIG. 1 is a schematic diagram of a towed source array.
Figure 2:
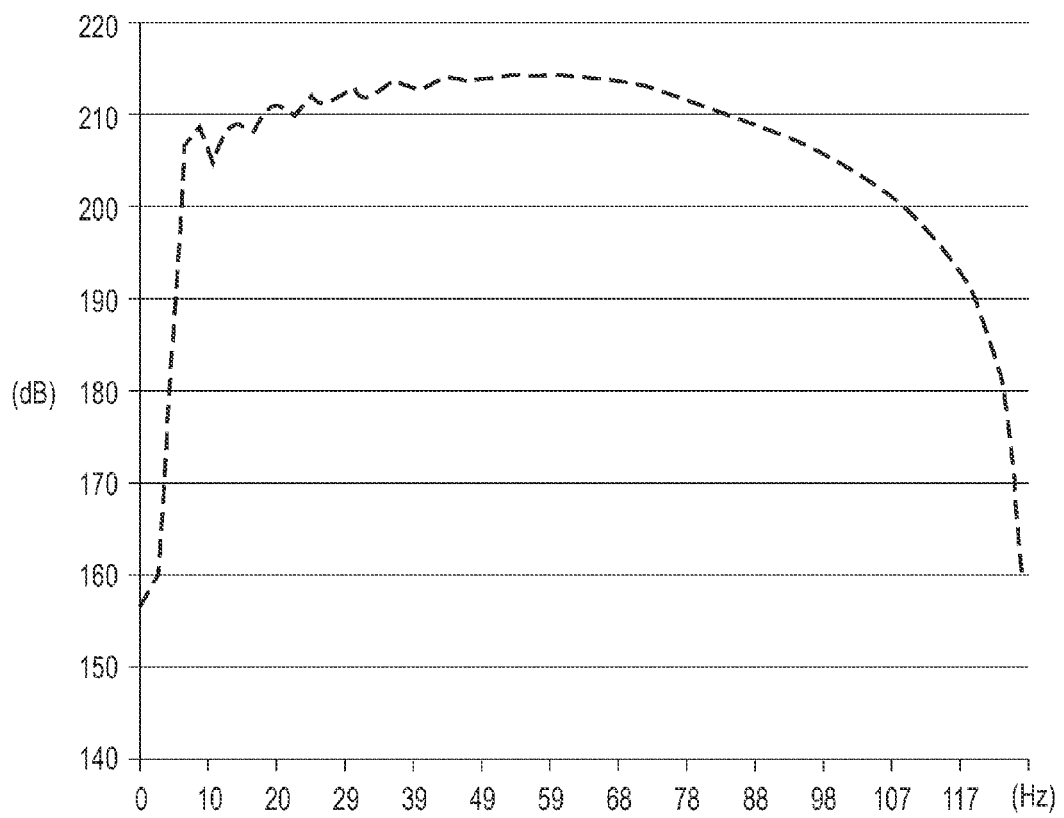
FIG. 2 is a plot of a far field signal spectrum.

FIG. 1 illustrates a schematic diagram of a towed source array 10. The towed source array 10 is towed by the streamer vessel 12 and includes sub-arrays 14, 16 and 18. Each of the sub-arrays 14, 16 and 18 includes a combination of air guns 20-54 of different volumes that shape the spectral output of the signal emitted, which may be flat between 7 to 80 Hz. For example, see FIG. 2, which illustrates a plot of a far field signal spectrum for the 5,085 $in^3$ array 10 having 3 sub-arrays 14, 16 and 18 towed at a depth of 6 m.

The sub-arrays 14, 16 and 18 each have a volume of, for example, 1695 $in^3$ provided by 2-290 $in^3$ air guns (20a, 20b, 32a, 32b, 44a, 44b), 2-195 $in^3$ air guns (22a, 22b, 34a, 34b, 46a, 46b), a 280 $in^3$ air gun (24, 36, 48), a 195 $in^3$ air gun (26, 38, 50), a 145 $in^3$ air gun (28, 40, 52) and a 105 $in^3$ air gun (30, 42, 54). In this, the sub-arrays 14, 16 and 18 provide a 5,085 $in^3$ volume for the array 10.

Although the streamer vessel 12 is shown towing one source array 10, the streamer vessel 12 may also tow two or more of the arrays 10 separated from each other (e.g., a distance of 50 meters (m) apart), fired in a flip/flop pattern. When there is sufficient compressor capacity, the two arrays 10 may be fired near-simultaneously with random time delays applied to one of the arrays 10.

The far field spectrum and aliasing effects associated with the source array 10 in FIG. 1 may be made according to the principles of the present disclosure by including two different sub-array designs with a first sub-array directed to high frequency components and a second sub-array directed to low frequency components. Providing a high frequency sub-array and a low-frequency sub array allows for spectral content of an emitted acoustic pressure wave and/or mitigation of aliasing effects affecting higher frequencies of the seismic band. At low frequency (e.g., below 15 Hz), the corresponding wavelengths are larger than a cross-line distance separating two source arrays (e.g., 50 m), or an inline distance separating two shot points (e.g., 25 m). Noise level of a signal to noise ratio profile of a seismic image increases as frequency decreases. Thus, if a single capacity source array is dimensioned to overcome the noise at low frequencies, there is a surplus of energy at high frequencies.

High Frequency Array

In the high frequency range, denser firing intervals help mitigate spatial aliasing effects. Moreover, shallower depths can help push ghost reflections higher in the seismic band. Experimental results indicate that one sub-array can supply enough energy above 20 Hz. Thus, in an embodiment of a towed array 100 shown in FIG. 3, one sub-array 102 is towed by the streamer vessel 12 at a shallow depth. The sub-array 102 may have a volume of 1,695 $in^3$ and be towed at a depth of 5 m.

The sub-array 102 may be fired with a dense firing interval to mitigate spatial aliasing effects. By reducing the firing interval from 25 m to 12.5 m the aliasing frequency shifts from 30 Hz to 60 Hz for a 1500 m/s signal. Gun volumes and source depth may be chosen to maximize output above a threshold frequency such as 30 Hz for the high frequency sub-array.

Low Frequency Array

Low frequency output (e.g., the output below the resonance frequency of the largest bubble) depends primarily on the total amount of air released, rather than how the air is distributed between guns, the number of guns used, or how the guns are distributed with depth. Accordingly, in order to optimize low frequency output, the amount of air allocated to the low frequency array may be increased, and in some embodiments, maximized. Increasing the amount of air, however, increases the demand on the compressor and may be limited by compressor availability and capacity. Thus, the amount of air allocated to the low frequency array can be increased by increasing the volume of the low frequency sub-array and also increasing the inline shot interval so that the low-frequency sub-array can be fully recharged between shots.

Although gun source depth can be less significant for output below the resonance frequency of the largest bubble, it can be more significant for low frequency output above the bubble frequency. Thus, the low frequency sub-array may be provided at a deeper depth relative to the high frequency sub-array. However, embodiments are contemplated in which the low frequency sub-array is provided at substantially the same depth as the high frequency sub-array.

Figure 3:
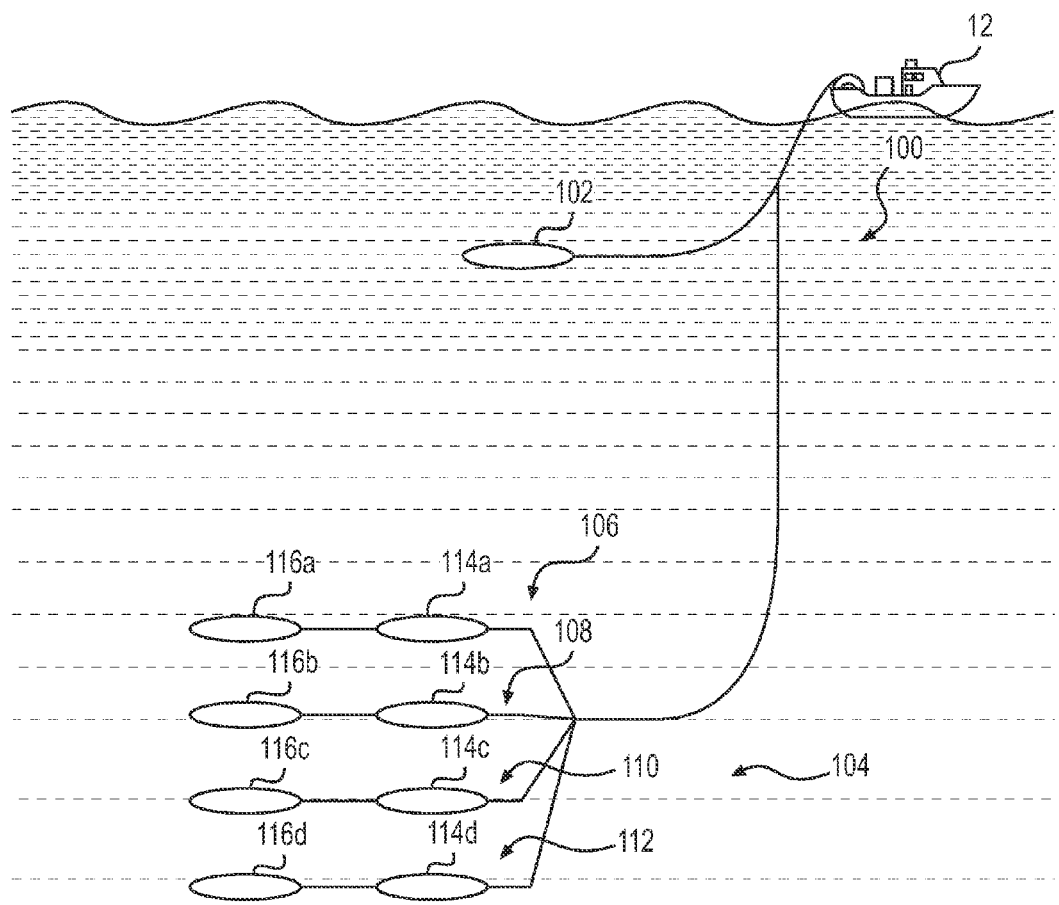
FIG. 3 is a schematic diagram of a towed source array including a high frequency sub-array and a low frequency sub-array.

In the towed array 100 shown in FIG. 3, the low-frequency sub-array 104 includes four sub-arrays 106, 108, 110 and 112 towed at a deeper depth relative to a high-frequency sub-array. Each sub-array 106, 108, 110 and 112 may include two further sub-arrays 114 and 116 to increase its volume. As illustrated, the low-frequency sub-array 104 includes 8 sub-arrays though other combinations are also contemplated. Providing air guns with larger chamber volumes or increasing and clustering the number of air guns associated with the low-frequency sub-array 104 may also provide the desired total volume for the sub-arrays 106, 108, 110 and 112. The sub-arrays 114 and 116 may each have a volume of 1,695 in$^3$ providing a total volume for the sub-array 104 of 13,560 in$^3$. Furthermore, the sub-array 104 may be towed at a depth of 20 m.

The low frequency sub-array can minimize, by hardware or de-tuning the array to limit the amount of energy in the high frequency, the emission of high frequencies that may contaminate the emissions from the high frequency sub-array. Dithered firing between the high frequency sub-array and the low-frequency sub-array or an air gun with reduced high frequency output may be used. An air gun with a high frequency cut off at about 25 Hz may be used. The low frequency sub-array may also take on a cluster configuration in which multiple air guns are grouped closely together.

Figure 4:
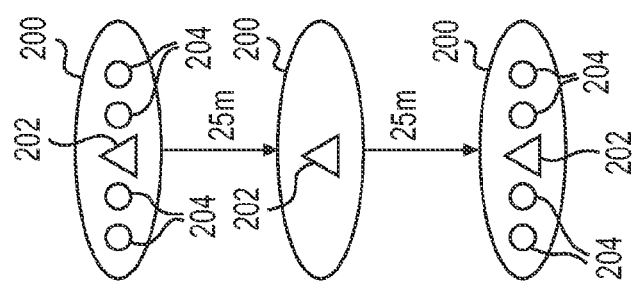
FIG. 4 is an overview diagram of a firing pattern of a towed source array including a high frequency sub-array and a low frequency sub-array.

FIG. 4 illustrates a firing pattern of a source array 200. The source array 200 includes a high frequency sub-array 202 and a low frequency sub-array 204. The high frequency sub-array 202 may be a single sub-array with a 1,695 in$^3$ volume towed at a depth of 6 m. The low frequency sub-array 204 may include 4 sub-arrays of 2×1,695 in$^3$ for a total volume of 13,650 in$^3$ towed at a depth of 20 m. The high frequency sub-array 202 is fired with a 25 m interval and the low frequency sub-array 204 is fired with a 50 m interval. An aspect of this firing pattern and the array 200 is improved low frequency content.

Figure 5:
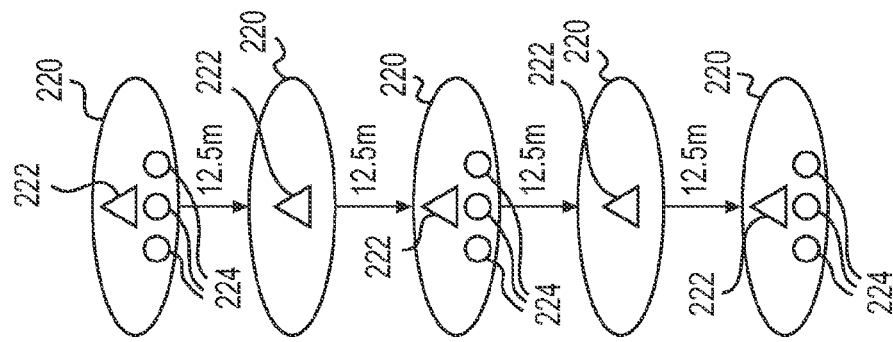
FIG. 5 is an overview diagram of a firing pattern of a towed source array including a high frequency sub-array and a low frequency sub-array.

FIG. 5 illustrates a firing pattern of a source array 220. The array 220 includes a high frequency sub-array 222 and a low frequency sub-array 224. The high frequency sub-array 222 may be a single sub-array with a 1,695 in$^3$ volume towed at a depth of 6 m. The low frequency sub-array 224 may include 3 sub-arrays of 1,695 in$^3$ for a total volume of 5,085 in$^3$ towed at a depth of 20 m. The high frequency sub-array 222 is fired with a 12.5 m interval and the low frequency sub-array 224 is fired with a 25 m interval. An aspect of this firing pattern and the array 220 is improved high frequency spatial sampling and low frequency content.

Figure 6:
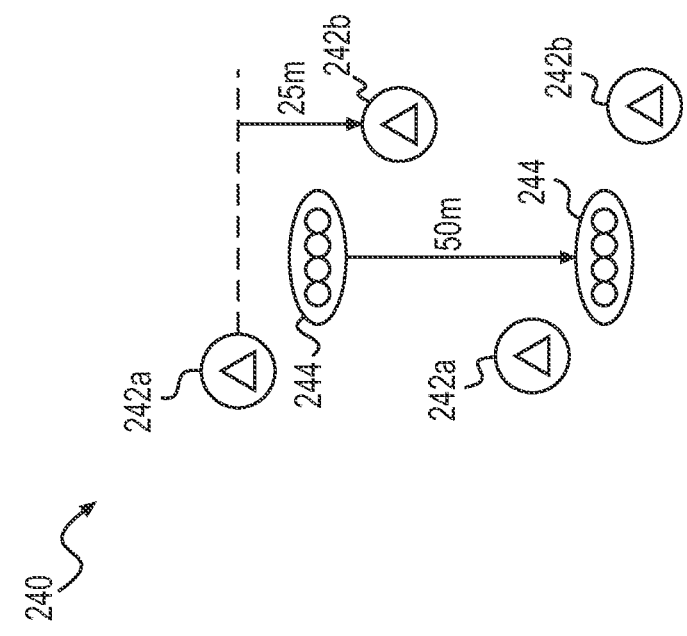
FIG. 6 is an overview diagram of a flip/flop firing pattern of a towed source array including high frequency sub-arrays and a low-frequency sub-array.

FIG. 6 illustrates a firing pattern of a source array 240 including a high frequency sub-array 242 and a low frequency sub-array 244. The high frequency sub-arrays 242 may be a single sub-array with 1,695 in$^3$ volume towed at a depth of 6 m and displaced from a center line of the array. The low frequency sub-array 244 may include 4 sub-arrays of 1,695 in$^3$ for a total volume of 6,780 in$^3$ towed at a depth of 20 m. The high frequency sub-arrays 242 are fired alternately with a 25 m interval and the low frequency sub-array 244 is fired with a 50 m interval. Thus, in some embodiments, the firing interval of the low frequency sub-array may be approximately twice the firing interval of the high frequency sub-array. An aspect of this firing pattern and the array 240 is the provision of flip/flop acquisition and reduced demand on the compressor by spacing out the air gun firings.

Figure 7:
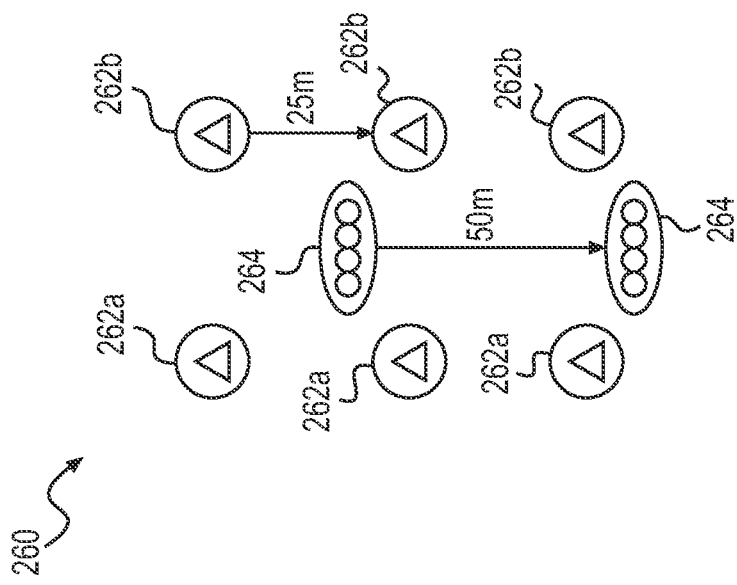
FIG. 7 is an overview diagram of a simultaneous firing pattern of a towed source array including high frequency sub-arrays and a low frequency sub-array.

FIG. 7 illustrates a firing pattern of a source array 260 including high frequency sub-arrays 262 and low frequency sub-arrays 264. The high frequency sub-arrays 262 may be single sub-arrays with 1,695 in$^3$ volumes towed at a depth of 6 m and displaced from a center line of the array. The low frequency sub-arrays 264 may include 4 sub-arrays of 3,390 in$^3$ for a total volume of 13,560 in$^3$ towed at a depth of 20 m. The high frequency sub-arrays 262 are fired simultaneously with a 25 m interval and the low frequency sub-array 264 is fired with a 50 m interval. An aspect of this firing pattern and the array 260 is the provision of simultaneous cross line shot positions and reduced demand on the compressor by spacing out the air gun firings.

Figure 8:
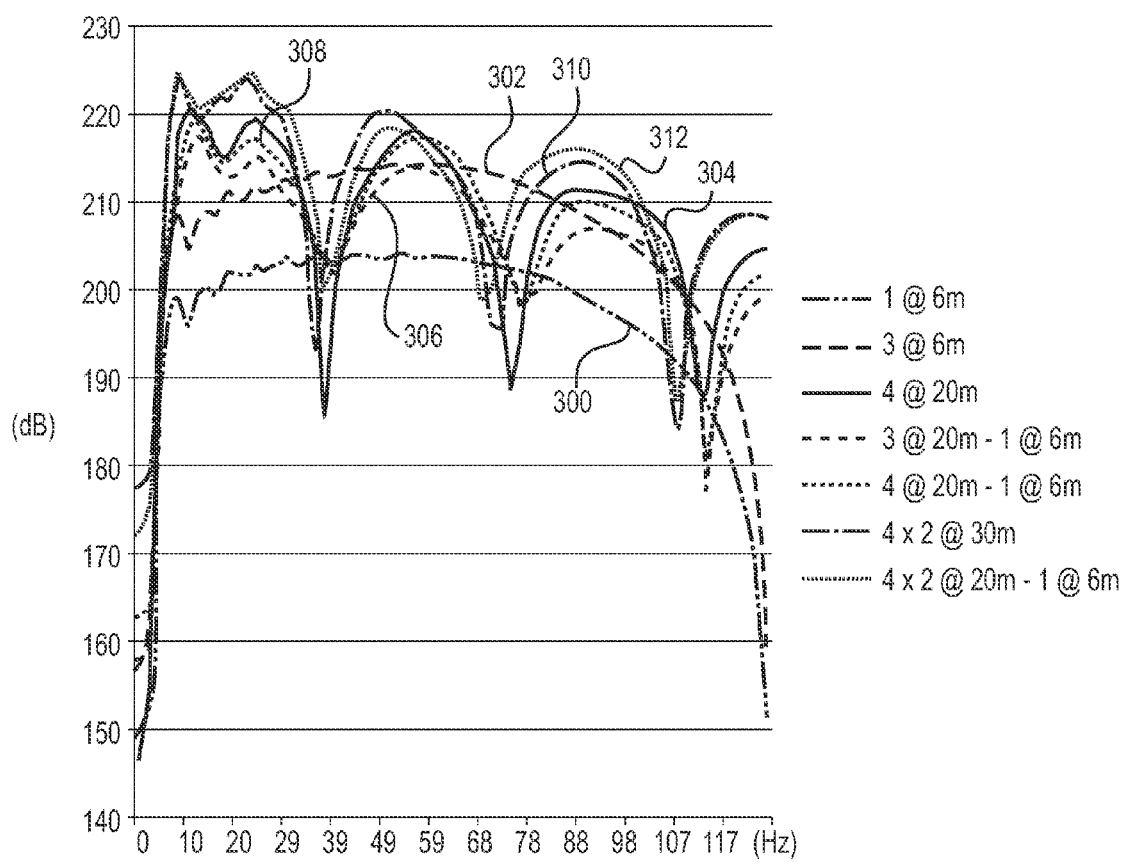
FIG. 8 is a plot of far field signal spectrum.

FIG. 8 illustrates a plot of a far field signal spectrum for arrays with different combinations of 1,695 in$^3$ sub-arrays. The trace 300 corresponds with 1 sub-array at a depth of 6 m. The trace 302 corresponds with 3 sub-arrays at a depth of 6 m. The trace 304 corresponds with 4 sub-arrays at a depth of 20 m. The trace 306 corresponds with 3 sub-arrays at a depth of 20 m and 1 sub-array at a depth of 6 m. The trace 308 corresponds with 4 sub-arrays at a depth of 20 m and 1 sub-array at a depth of 6 m. The trace 310 corresponds with 4×2 sub-arrays at a depth of 30 m. The trace 312 corresponds with 4×2 sub-arrays at 30 m and 1 sub-array at 6 m.

Although the above-described firing patterns generally have substantially equal shot times, the shot times may also vary between firings. The shot time interval may be selected to optimize two way travel time and residual shot noise.

Other contemplated variations according to the present disclosure include selecting the high frequency and low frequency sub-arrays to minimize variations in directivity between the sub-arrays for the high frequency output. Such an arrangement may reduce noise in the signal from the high frequency sub-array induced by misdirected energy from the low frequency sub-array.

In another variation, multiple sources (e.g., more than 2) may be provided from the same streamer vessel. The sub-arrays may be provided by multiple sources. Also, multiple sub-arrays may be provided in sequence such that a larger survey area may be covered at a given time.

In still another variation, high-frequency sub-arrays may be provided that are slightly different. It is desirable to minimize cross-talk between high frequency and low-frequency sub-arrays. In embodiments where a first high frequency sub-array is fired together with a low frequency sub-array, and this is followed by firing of a second high frequency sub-array, residual high frequency energy from the low frequency array may alter the high frequency spectral output. In some cases, this can be mitigated by detuning sources to attenuate the high frequency residual of the low frequency array. Also, the second high frequency sub-array may be provided to have a high frequency spectral output substantially similar to the high frequency spectral output of the first high frequency sub-array together with the high frequency residual from the low-frequency sub-array. The different high frequency sub-arrays may be provided by two high frequency sources with different volumes or different firing pressures. It is not necessary to provide separate equipment to provide the two sources. That is, a single source may be used that can alter its spectral output (e.g., volume, firing pressure, etc.), to provide the different spectral outputs. Also, the high frequency sub-arrays may be provided such that only the directivities are the same.

It will be appreciated that the principles disclosed herein are applicable to a wide range of seismic surveys including, but not limited to, those incorporating single-component receivers (i.e., hydrophone only receivers), multi-component receivers (e.g., those including pressure sensors and particle motion sensors, such as accelerometers), and various combinations thereof.

It will also be appreciated that the above-discussion is not limited to marine seismic acquisition. For example, receivers may also be deployed in a borehole (e.g., walkaway or 3D vertical wellbore VSP acquisition).

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Words of comparison, measurement, and time such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A seismic source array, comprising:
   a first source including a first plurality of air guns having a first total volume, the first source having a first spectral output; and
   a second source including a second plurality of air guns having a second total volume different from the first total volume, the second source having a second spectral output different than the first spectral output, wherein
   the first source is configured to activate at a first interval, and
   the second source is configured to activate at a second interval different than the first interval.

2. The seismic source array of claim 1, wherein the second interval is approximately twice the first interval.

3. The seismic source array of claim 1, wherein the first spectral output substantially does not overlap with the second spectral output.

4. The seismic source array of claim 2, wherein an activation pattern of the first and second sources includes the first and second sources together followed by the second source without the first source.

5. The seismic source array of claim 1, wherein the second source includes first and second sub-sources, the first and second sub-sources being configured to be towed spaced from and at opposing sides of the first source.

6. The seismic source array of claim 5, wherein the first and second sub-sources of the second source are configured to activate substantially at the same time.

7. The seismic source array of claim 6, wherein an activation pattern of the first and second sources includes the second source, followed by the first source without the second source, followed by the second source.

8. The seismic source array of claim 5, wherein the first and second sub-sources of the second source are configured to activate with an alternating pattern.

9. The seismic source array of claim 5, wherein an activation pattern of the first and second sources includes the first sub-source of the second source, followed by the first source, followed by the second sub-source of the second source.

10. A method of seismic surveying, comprising:
    towing a first source having a first spectral output, the first source including a first plurality of air guns having a first total volume;
    towing a second source having a second spectral output, the second spectral output being different than the first spectral output, the second source including a second plurality of air guns having a second total volume, the first total volume being greater than the second total volume;
    activating the first source at a first interval; and
    activating the second source at a second interval different than the first interval.

11. The method of claim 10, wherein the first spectral output substantially does not overlap with the second spectral output.

12. The method of claim 10, wherein an activation pattern of the first and second sources includes the first and second sources together followed by the second source without the first source.

13. The method of claim 10, wherein the towing the second source includes towing first and second sub-sources spaced from and at opposing sides of the first source.

14. The method of claim 13, wherein an activation pattern of the first and second sources includes the second source, followed by the first source without the second source, followed by the second source.

15. The method of claim 13, wherein the activating the second source includes activating the first and second sub-sources with an alternating pattern.

16. The method of claim 13, wherein an activation pattern of the first and second sources includes the first sub-source of the second source, followed by the first source, followed by the second sub-source of the second source.

17. The seismic source array of claim 1, wherein the second interval is less than the first interval.

* * * * *